US012110371B2

(12) United States Patent
Lin et al.

(10) Patent No.: US 12,110,371 B2
(45) Date of Patent: Oct. 8, 2024

(54) ORIENTED POLYETHYLENE FILMS AND A METHOD FOR MAKING THE SAME

(71) Applicant: Dow Global Technologies LLC, Midland, MI (US)

(72) Inventors: Yijian Lin, Manvel, TX (US); Mehmet Demirors, Pearland, TX (US); Jianping Pan, Pudong (CN); Xiao B. Yun, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 778 days.

(21) Appl. No.: 17/206,918

(22) Filed: Mar. 19, 2021

(65) Prior Publication Data

US 2021/0206928 A1    Jul. 8, 2021

Related U.S. Application Data

(60) Continuation of application No. 16/573,057, filed on Sep. 17, 2019, now abandoned, which is a division of application No. 15/302,967, filed as application No. PCT/CN2014/074992 on Apr. 9, 2014, now Pat. No. 10,457,787.

(51) Int. Cl.
| | |
|---|---|
| *B32B 27/32* | (2006.01) |
| *B29C 48/08* | (2019.01) |
| *B29C 48/21* | (2019.01) |
| *B32B 27/08* | (2006.01) |
| *B32B 27/16* | (2006.01) |
| *B32B 27/20* | (2006.01) |
| *C08J 5/18* | (2006.01) |
| *C08L 23/06* | (2006.01) |
| *B29C 48/00* | (2019.01) |
| *B29K 23/00* | (2006.01) |

(52) U.S. Cl.
CPC .......... *C08J 5/18* (2013.01); *B29C 48/08* (2019.02); *B29C 48/21* (2019.02); *B32B 27/08* (2013.01); *B32B 27/16* (2013.01); *B32B 27/205* (2013.01); *B32B 27/32* (2013.01); *C08L 23/06* (2013.01); *B29C 48/0018* (2019.02); *B29K 2023/0625* (2013.01); *B32B 2250/242* (2013.01); *B32B 2307/518* (2013.01); *B32B 2307/54* (2013.01); *B32B 2307/72* (2013.01); *C08J 2323/06* (2013.01); *C08J 2423/06* (2013.01); *C08L 2203/16* (2013.01); *C08L 2205/025* (2013.01); *C08L 2314/02* (2013.01)

(58) Field of Classification Search
None
See application file for complete search history.

(56) References Cited

U.S. PATENT DOCUMENTS

| | | | |
|---|---|---|---|
| 5,272,236 A | 12/1993 | Lai et al. | |
| 5,278,272 A | 1/1994 | Lai et al. | |
| 5,380,810 A | 1/1995 | Lai et al. | |
| 5,460,861 A | 10/1995 | Vicik et al. | |
| 5,614,315 A | 3/1997 | Kondo et al. | |
| 5,759,675 A * | 6/1998 | Hamada | B29C 61/003 |
| | | | 428/173 |
| 8,080,294 B2 | 12/2011 | Lu | |
| 8,372,931 B2 | 2/2013 | Hermel-Davidock et al. | |
| 10,457,787 B2 | 10/2019 | Lin et al. | |
| 2003/0144426 A1 | 7/2003 | Williams | |
| 2006/0057410 A1 | 3/2006 | Saavedra et al. | |
| 2009/0011263 A1 | 1/2009 | Fornoli | |
| 2009/0286024 A1 | 11/2009 | Lu | |
| 2010/0209640 A1 | 8/2010 | Yun | |

FOREIGN PATENT DOCUMENTS

| | | |
|---|---|---|
| JP | A-H07-149962 | 6/1995 |
| JP | A-H08-090737 | 4/1996 |
| WO | 2005090425 | 9/2005 |
| WO | 2005090426 | 9/2005 |
| WO | 2005090427 | 9/2005 |
| WO | 2013029223 | 3/2013 |

OTHER PUBLICATIONS

International Search Report & Written Opinion for related PCT Application PCT/CN2014/074992, mailed Jan. 15, 2015.
International Preliminary Report on Patentability for related PCT Application PCT/CN2014/074992, mailed Oct. 20, 2016.
Monrabal, et al., Crystallization Elution Fractionation (CEF) A New Separation Process for Polyolefin Resins, Macromol. Symp. 257, 71-79 (2007).
A.M. Striegel, et al., "Modern Size-Exclusion Liquid Chromatography", 2nd Edition, p. 242 and p. 263 (2009).
https://en.wikipedia.org/wiki/Linear_low-density_polyethylene (Year: 2020) (3 pgs).
https://en.wikipedia.org/wiki/Medium-density_polyethylene (Year: 2019) (2 pgs).

* cited by examiner

*Primary Examiner* — Michael J Feely
(74) *Attorney, Agent, or Firm* — Jacob R. Graham

(57) ABSTRACT

A first oriented film comprising a first polyethylene composition which comprises: from 20 to 50 wt % of a first linear low density polyethylene polymer having a density greater than 0.925 g/cc and an $I_2$ lower than 2 g/10 min; and from 80 to 50 wt % of a second linear low density polyethylene polymer having a density lower than or equal to 0.925 g/cc and an $I_2$ greater than or equal to 2 g/10 min; wherein the first polyethylene composition has an $I_2$ from 0.5 to 10 g/10 min and a density from 0.910 to 0.940 g/cc is provided.

12 Claims, No Drawings

ORIENTED POLYETHYLENE FILMS AND A METHOD FOR MAKING THE SAME

CLAIM OF PRIORITY

This application is a Continuation of U.S. application Ser. No. 16/573,057, filed Sep. 17, 2019 and published as U.S. Publication No. 2020-0010631 A1 on Jan. 9, 2020, which is a Divisional of US § 371 National Stage Application 15/302, 967, filed Oct. 7, 2016 and published as U.S. Publication No. 2017/0029583 on Feb. 2, 2017 and issued as U.S. Pat. No. 10,457,787 on Oct. 29, 2019, which claims priority to International Application Number PCT/CN2014/074992, filed Apr. 9, 2014 and published as WO 2015/154253 on Oct. 15, 2015, the entire contents of which are incorporated herein by reference in its entirety.

FIELD OF INVENTION

The instant invention relates to oriented polyethylene films and a method for making the same.

BACKGROUND OF THE INVENTION

Tenter frame sequential biaxial orientation process is one of the common fabrication processes in the polymer film industry. In this process, polymers are oriented in the semi-solid state, which is significantly different from the orientation in the molten state, as occurs in traditional blown film or cast film processes. Most physical properties, including clarity, stiffness and toughness, are dramatically improved upon the semi-solid state orientation. Polymers that can be processed by the tenter frame include polypropylene (PP), polyethylene terephthalate (PET), and polyamide (PA). However, currently available polyethylenes cannot be oriented by the tenter frame process, due to their poor stretchability.

SUMMARY OF THE INVENTION

The instant invention includes oriented polyethylene films and a method for making the same.

In one embodiment, the instant invention provides a first oriented film comprising a first polyethylene composition which comprises: from 20 to 50 wt % of a first linear low density polyethylene polymer having a density greater than 0.925 g/cc and an $I_2$ lower than 2 g/10 min; and from 80 to 50 wt % of a second linear low density polyethylene polymer having a density lower than 0.925 g/cc and an $I_2$ greater than 2 g/10 min; wherein the first polyethylene composition has an $I_2$ from 0.5 to 10 g/10 min and a density from 0.910 to 0.940 g/cc.

DETAILED DESCRIPTION OF THE INVENTION

The instant invention includes oriented polyethylene films and a method for making the same.

A first embodiment provides a first oriented film comprising a first polyethylene composition which comprises: from 20 to 50 wt % of a first linear low density polyethylene polymer having a density greater than or equal to 0.925 g/cc and an $I_2$ lower than or equal to 2 g/10 min; and from 80 to 50 wt % of a second linear low density polyethylene polymer having a density lower than or equal to 0.925 g/cc and an $I_2$ greater than or equal to 2 g/10 min; wherein the first polyethylene composition has an $I_2$ from 0.5 to 10 g/10 min and a density from 0.910 to 0.940 g/cc.

The first polyethylene composition comprises from 20 to 50 wt % of a first linear low density polyethylene polymer. All individual values and subranges from 20 to 50 percent by weight (wt %) are included herein and disclosed herein; for example the amount of the first linear low density polyethylene polymer can be from a lower limit of 20, 30, or 40 wt % to an upper limit of 25, 35, 45, or 50 wt %. For example, the amount of the first linear low density polyethylene polymer can be from 20 to 50 wt %, or in the alternative, from 20 to 35 wt %, or in the alternative, from 35 to 50 wt %, or in the alternative from 25 to 45 wt %.

The first linear low density polyethylene polymer has a density greater than or equal to 0.925 g/cc. All individual values and subranges greater than or equal to 0.925 g/cc are included herein and disclosed herein; for example, the density of the first linear low density polyethylene polymer can be from a lower limit of 0.925, 0.928, 0.931 or 0.34 g/cc. In some aspects of the invention, the first linear low density polyethylene polymer has a density less than or equal to 0.98 g/cc. All individual values and subranges of less than 0.98 are included herein and disclosed herein; for example, the first linear low density polyethylene polymer can have a density from an upper limit of 0.98, 0.97, 0.96 or 0.95 g/cc.

The first linear low density polyethylene polymer has an $I_2$ less than or equal to 2 g/10 min. All individual values and subranges from 2 g/10 min are included herein and disclosed herein. For example, the first linear low density polyethylene polymer can have a density from an upper limit of 2, 1.9, 1.8, 1.7, 1.6 or 1.5 g/10 min. In a particular aspect of the invention, the first linear low density polyethylene polymer has an $I_2$ with a lower limit of 0.01 g/10 min. All individual values and subranges from 0.01 g/10 min are included herein and disclosed herein. For examples the first linear low density polyethylene polymer can have an $I_2$ greater than or equal to 0.01, 0.05, 0.1, 0.15 g/10 min.

The first polyethylene composition comprises from 80 to 50 wt % of a second linear low density polyethylene polymer. All individual values and subranges from 80 to 50 wt % are included herein and disclosed herein; for example, the amount of the second linear low density polyethylene can be from a lower limit of 50, 60 or 70 wt % to an upper limit of 55, 65, 75 or 80 wt %. For example, the amount of the second linear low density polyethylene polymer can be from 80 to 50 wt %, or in the alternative, from 80 to 60 wt %, or in the alternative, from 70 to 50 wt %, or in the alternative, from 75 to 60 wt %.

The second linear low density polyethylene polymer has a density lower than or equal to 0.925 g/cc. All individual values and subranges lower than or equal to 0.925 g/cc are included herein and disclosed herein; for example, the density of the second linear low density polyethylene polymer can have an upper limit of 0.925, 0.921, 0.918, 0.915, 0.911, or 0.905 g/cc. In a particular aspect, the density of the second linear low density polyethylene polymer can have a lower limit of 0.865 g/cc. All individual values and subranges equal to or greater than 0.865 g/cc are included herein and disclosed herein; for example, the density of the second linear low density polyethylene polymer can have a lower limit of 0.865, 0.868, 0.872, or 0.875 g/cc.

The second linear low density polyethylene polymer has an $I_2$ greater than or equal to 2 g/10 min. All individual values and subranges from 2 g/10 min are included herein and disclosed herein; for example, the $I_2$ of the second linear low density polyethylene polymer can have a lower limit of 2, 2.5, 5, 7.5 or 10 g/10 min. In a particular aspect, the second linear low density polyethylene polymer has an $I_2$ of less than or equal to 1000 g/10 min.

The first polyethylene composition has an $I_2$ from 0.5 to 10 g/10 min. All individual values and subranges from 0.5 to 10 g/10 min are included herein and disclosed herein; for example the $I_2$ of the first polyethylene composition can be from a lower limit of 0.5, 1, 4, 7, or 9 g/10 min to an upper limit of 0.8, 1.6, 5, 8 or 10 g/10 min. For example the $I_2$ of the first polyethylene composition can be from 0.5 to 10 g/10 min, or in the alternative, from 0.5 to 5 g/10 min, or in the alternative, from 5 to 10 g/10 min, or in the alternative, from 2 to 8 g/10 min, or in the alternative, from 3 to 7 g/10 min.

The first polyethylene composition has a density from 0.910 to 0.940 g/cc. All individual values and subranges from 0.910 to 0.940 g/cc are included herein and disclosed herein; for example, the density of the first polyethylene composition can be from a lower limit of 0.91, 0.92, or 0.93 g/cc to an upper limit of 0.915, 0.925, 0.935 or 0.94 g/cc. For example, the density of the first polyethylene composition can be from 0.910 to 0.940 g/cc, or in the alternative, from 0.91 to 0.925 g/cc, or in the alternative, from 0.925 to 0.94 g/cc, or in the alternative, from 0.92 to 0.935 g/cc.

The invention further provides the first oriented film according to any embodiment disclosed herein except that the first and/or second linear low density polyethylene polymer(s) is produced using a Ziegler-Natta catalyst.

The invention further provides the first oriented film according to any embodiment disclosed herein except that the first linear low density polyethylene polymer has a density greater than or equal to 0.930 g/cc and an $I_2$ lower than 1 g/10 min.

The invention further provides the first oriented film according to any embodiment disclosed herein except that the second linear low density polyethylene polymer has a density less than 0.920 g/cc and an $I_2$ greater than 4 g/10 min.

In another embodiment, the invention provides a second oriented film comprising a second polyethylene composition which comprises: from 50 to 80 wt % of a third linear low density polyethylene polymer having a density greater than 0.925 g/cc and an $I_2$ less than 2 g/10 min; and from 50 to 20 wt % of a fourth linear low density polyethylene polymer having a density lower than 0.920 g/cc and an $I_2$ greater than 2 g/10 min; wherein the second polyethylene composition has an $I_2$ from 0.5 to 10 g/10 min and a density from 0.910 to 0.940 g/cc.

The second polyethylene composition comprises from 50 to 80 wt % of a third linear low density polyethylene polymer. All individual values and subranges from 50 to 80 wt % are included herein and disclosed herein; for example, the amount of third linear low density polyethylene polymer can be from a lower limit of 50, 60, or 70 wt % to an upper limit of 55, 65, 75 or 80 wt %. For example, the amount of the third linear low density polyethylene polymer can be from 50 to 80 wt %, or in the alternative, from 60 to 80 wt %, or in the alternative, from 55 to 80 wt %, or in the alternative, from 60 to 70 wt %.

The third linear low density polyethylene polymer has a density greater than or equal to 0.925 g/cc. All individual values and subranges greater than 0.925 g/cc are included herein and disclosed herein; for example, the density of the third linear low density polyethylene polymer can have a lower limit of 0.925, 0.928, 0.931, 0.934, 0.939 or 0.943 g/cc. In a particular embodiment, the third linear low density polyethylene polymer has a density less than or equal to 0.98 g/cc. All individual values and subranges less than or equal to 0.98 g/cc are included herein and disclosed herein; for example the upper limit of the density of the third linear low density polyethylene polymer can be 0.98, 0.97, 0.965, 0.962, 0.955, or 0.951 g/cc.

The third linear low density polyethylene polymer has an $I_2$ less than or equal to 2 g/10 min. All individual values and subranges less than 2 g/10 min are included herein and disclosed herein; for example, the upper limit of the $I_2$ of the third linear low density polyethylene polymer can be from an upper limit of 2, 1.7, 1.4, 1.1 or 0.9 g/10 min. In a particular embodiment, the $I_2$ of the third linear low density polyethylene polymer is greater than or equal to 0.01 g/10 min. All individual values and subranges greater than 0.01 g/10 min are included herein and disclosed herein; for example the lower limit of the $I_2$ of the third linear low density polyethylene polymer can be 0.01, 0.05, 0.1, 0.15 g/10 min.

The invention further provides the second oriented film according to any embodiment disclosed herein except that the third linear low density polyethylene polymer is produced using a Ziegler-Natta catalyst.

The invention further provides the second oriented film according to any embodiment disclosed herein except that the fourth linear low density polyethylene polymer is produced using a molecular catalyst. Molecular catalyst are homogeneous polymerization catalysts which comprise (a) a transition metal, (b) one or more non-substituted or substituted cyclopentadienyl ligands, and/or (c) one or more ligands containing at least one heteroatom, such as, oxygen, nitrogen, phosphorus, and/or sulfur. Molecular catalyst may be immobilized on an inorganic support, such as silica, alumina, or $MgCl_2$.

The invention further provides the second oriented film according to any embodiment disclosed herein except that the third linear low density polyethylene polymer has a density greater than 0.930 g/cc and an $I_2$ lower than 1 g/10 min.

The invention further provides the second oriented film according to any embodiment disclosed herein except that the fourth linear low density polyethylene polymer has a density less than 0.915 g/cc and an $I_2$ greater than 4 g/10 min.

In another embodiment, the invention provides a third oriented film comprising a third polyethylene composition which comprises from 75 to less than 100 wt % of the first polyethylene composition according to any embodiment disclosed herein and/or the second polyethylene composition according to any embodiment disclosed herein; and greater than 0 to 25 wt % of at least one ethylene-based or propylene-based polymer. The third oriented film comprises a third polyethylene composition which comprises from 75 to less than 100 wt % of the first polyethylene composition according to any embodiment disclosed herein. All individual values and subranges from 75 to less than 100 wt % are included herein and disclosed herein. For example, the amount of the first polyethylene composition in the third polyethylene composition can be from a lower limit of 75, 80, 85, 90, or 95 wt % to an upper limit of 99.99, 99, 98, 93, 89, 84 or 80 wt %. For example, the amount of the first polyethylene composition in the third polyethylene composition can be from 75 to less than 100 wt %, or in the alternative, from 80 to 99 wt %, or in the alternative, from 84 to 99.99 wt %, or in the alternative, from 80 to 90 wt %.

The third polyethylene composition comprises greater than 0 to 25 wt % of at least one ethylene-based or propylene-based polymer. All individual values and subranges from greater than 0 to 25 wt % are included herein and disclosed herein; for example, the amount of the at least one ethylene-based or propylene-based polymer can be from a lower limit of 0.01, 0.5, 1, 8, 14, 19 or 24 wt % to an upper limit of 0.8, 3, 10, 15, 20 or 25 wt %. For example, the amount of the at least one ethylene-based or propylene-based polymer can be from greater than 0 to 25 wt %, or in the alternative, from 1 to 15 wt %, or in the alternative, from 16 to 25 wt %, or in the alternative, from 5 to 20 wt %.

The term "ethylene-based polymer," as used herein, refers to a polymer that comprises, in polymerized form, a majority amount of ethylene monomer (based on the weight of the polymer), and optionally may comprise one or more comonomers. Exemplary ethylene-based polymers include low density polyethylene (LDPE, e.g., LDPE having a density from 0.917 to 0.924 g/cc and an $I_2$ of from 0.2 to 75 g/10 min), linear low density polyethylene (LLDPE, e.g., DOWLEX which is an ethylene/1-octene polyethylene made by The Dow Chemical Company with a typical density between about 0.915 and 0.940 g/cc and a typical $I_2$ between about 0.5 and 30 g/10 min), homogeneously branched, linear ethylene/alpha-olefin copolymers (e.g., TAFMER polymers by Mitsui Chemicals America, Inc. and EXACT polymers by ExxonMobil Chemical (ExxonMobil)), homogeneously branched, substantially linear ethylene/alpha-olefin polymers (e.g., AFFINITY and ENGAGE polymers made by The Dow Chemical Company and described in U.S. Pat. Nos. 5,272,236, 5,278,272 and 5,380,810, the disclosures of which are incorporated herein by reference), catalytic linear statistical olefin copolymers (e.g., INFUSE which are polyethylene/olefin block polymers, particularly polyethylene/alpha-olefin block polymers and especially polyethylene/1-octene block polymers, made by The Dow Chemical Company and described in WO 2005/090425, 2005/090426 and 2005/090427, the disclosures of which are incorporated herein by reference), and high pressure, free radical polymerized ethylene copolymers such as ethylene/vinyl acetate (EVA) and ethylene/acrylate and ethylene/methacrylate polymers (e.g., ELVAX. and ELVALOY polymers, respectively, commercially available from E. I. Du Pont du Nemours & Co. (Du Pont)) and ethylene/acrylic (EAA) and ethylene/methacrylic acid (EMAA) polymers (e.g., PRIMACOR EAA polymers commercially available from The Dow Chemical Company and NUCREL EMAA polymers commercially available from Du Pont).

The term "propylene-based polymer," as used herein, refers to a polymer that comprises, in polymerized form, a majority amount of units derived from propylene monomer (based on the weight of the polymer), and optionally may comprise one or more comonomers. Exemplary propylene-based polymers include those available under the tradename VERSIFY, commercially available from The Dow Chemical Company.

The invention further provides the first oriented film according to any embodiment disclosed herein except that the first oriented film according to claim 1, wherein the first polyethylene composition has $MW_{HDF>95}$ greater than 135 kg/mol and $I_{HDF>95}$ greater than 42 kg/mol.

The invention further provides the second oriented film according to any embodiment disclosed herein except that the second oriented film according to claim 6, wherein the first polyethylene composition has $MW_{HDF>95}$ greater than 135 kg/mol and $I_{HDF>95}$ greater than 42 kg/mol.

The invention further provides the third oriented film according to any embodiment disclosed herein except that the first polyethylene composition has $MW_{HDF>95}$ greater than 135 kg/mol and $I_{HDF>95}$ greater than 42 kg/mol.

The invention further provides the first oriented film according to any embodiment disclosed herein except that the first oriented film according to any embodiment disclosed herein, wherein the first oriented film is oriented below the melting point of the first polyethylene composition.

The invention further provides the second oriented film according to any embodiment disclosed herein except that the second oriented film according to any embodiment disclosed herein, wherein the second oriented film is oriented below the melting point of the second polyethylene composition, The invention further provides the third oriented film according to any embodiment disclosed herein except that the third oriented film according to any embodiment disclosed herein, wherein the third oriented film is oriented below the melting point of the third polyethylene composition.

The invention further provides the first oriented film according to any embodiment disclosed herein except that the first oriented film is a biaxially oriented film.

The invention further provides the second oriented film according to any embodiment disclosed herein except that the second oriented film is a biaxially oriented film.

The invention further provides the third oriented film according to any embodiment disclosed herein except that the third oriented film is a biaxially oriented film.

The invention further provides the first biaxially oriented film according to any embodiment disclosed herein except that the first biaxially oriented film has been oriented via a sequential orientation process with a machine direction (MD) draw ratio greater than 3 and a transverse direction (TD) draw ratio greater than 5.

The invention further provides the second biaxially oriented film according to any embodiment disclosed herein except that the second biaxially oriented film has been oriented via a sequential orientation process with an MD draw ratio greater than 3 and a TD draw ratio greater than 5.

The invention further provides the third biaxially oriented film according to any embodiment disclosed herein except that the third biaxially oriented film has been oriented via a sequential orientation process with an MD draw ratio greater than 3 and a TD draw ratio greater than 5.

With respect to each of the first, second and third biaxially oriented films, all individual values and subranges of an MD draw ratio equal to or greater than 3 are included herein and disclosed herein. For example, the MD draw ratio can be equal to or greater than 3, 3.5, 4, 4.5 or 5. In a particular embodiment, the MD draw ratio is equal to or less than 8. All individual values and subranges of equal to or less than 8 are included herein and disclosed herein; for example, the MD draw ratio can be from an upper limit of 8, 7, or 6.

With respect to each of the first, second and third biaxially oriented films, all individual values and subranges of a TD draw ratio greater than 5 are included herein and disclosed herein. For example, the TD draw ratio can be greater than 5, 5.5, 6, 6.5 or 7. In a particular embodiment, the TD draw ratio is equal to or less than 13. All individual values and subranges of equal to or less than 13 are included herein and disclosed herein; for example, the TD draw ratio can be from an upper limit of 13, 12, 11, 10, 9 or 8.

The invention further provides the first biaxially oriented film according to any embodiment disclosed herein except that the first biaxially oriented film has been oriented via a simultaneous orientation process with an MD draw ratio greater than 4 and a TD draw ratio greater than 4. In a particular embodiment, the MD draw ratio has an upper limit of 8 and a TD draw ratio upper limit of 8.

The invention further provides the second biaxially oriented film according to any embodiment disclosed herein except that the second biaxially oriented film has been oriented via a simultaneous orientation process with an MD draw ratio greater than 4 and a TD draw ratio greater than 4. In a particular embodiment, the MD draw ratio has an upper limit of 8 and a TD draw ratio upper limit of 8.

The invention further provides the third biaxially oriented film according to any embodiment disclosed herein except that the third biaxially oriented film has been oriented via a simultaneous orientation process with an MD draw ratio greater than 4 and a TD draw ratio greater than 4. In a particular embodiment, the MD draw ratio has an upper limit of 8 and a TD draw ratio upper limit of 8.

In yet another aspect the invention provides a first co-extruded film comprising at least one film layer comprising the first oriented film according to any embodiment disclosed herein.

In yet another aspect the invention provides a first laminated film comprising at least one film layer comprising the first oriented film according to any embodiment disclosed herein.

In yet another aspect the invention provides a second co-extruded film comprising at least one film layer comprising the second oriented film according to any embodiment disclosed herein.

In yet another aspect the invention provides a second laminated film comprising at least one film layer comprising the second oriented film according to any embodiment disclosed herein.

In yet another aspect the invention provides a third co-extruded film comprising at least one film layer comprising the third oriented film according to any embodiment disclosed herein.

In yet another aspect the invention provides a third laminated film comprising at least one film layer comprising the third oriented film according to any embodiment disclosed herein.

In yet another embodiment, the present disclosure provides a first oriented film in accordance with any of the embodiments disclosed herein except that the first oriented film exhibits one or more of the following properties: (a) ultimate tensile strength averaged in MD and TD, measured according to ASTM D882, greater than or equal to 40 MPa; and (b) 2% secant modulus averaged in MD and TD, measured according to ASTM D882, is greater than or equal to 350 MPa. All individual values and subranges of an averaged ultimate tensile strength greater than or equal to 40 MPa are included herein and disclosed herein; for example, the averaged ultimate tensile strength of the first oriented film can be greater than or equal to 40 MPa, or in the alternative, from greater than or equal to 75 Mpa, or in the alternative, from greater than or equal to 100 MPa. All individual values and subranges of an averaged 2% secant modulus greater than or equal to 350 MPa are included herein and disclosed herein; for example, the averaged 2% secant modulus of the first oriented film can be greater than or equal to 350 MPa, or in the alternative, from greater than or equal to 750 MPa, or in the alternative, from greater than or equal to 1000 MPa.

In yet another embodiment, the present disclosure provides a second oriented film in accordance with any of the embodiments disclosed herein except that the second oriented film exhibits one or more of the following properties: (a) ultimate tensile strength averaged in MD and TD, measured according to ASTM D882, greater than or equal to 40 MPa; and (b) 2% secant modulus averaged in MD and TD, measured according to ASTM D882, is greater than or equal to 350 MPa. All individual values and subranges of an averaged ultimate tensile strength greater than or equal to 40 MPa are included herein and disclosed herein; for example, the averaged ultimate tensile strength of the second oriented film can be greater than or equal to 40 MPa, or in the alternative, from greater than or equal to 75 MPa, or in the alternative, from greater than or equal to 100 MPa. All individual values and subranges of an averaged 2% secant modulus greater than or equal to 350 MPa are included herein and disclosed herein; for example, the averaged 2% secant modulus of the second oriented film can be greater than or equal to 350 MPa, or in the alternative, from greater than or equal to 750 Mpa, or in the alternative, from greater than or equal to 1000 MPa.

In yet another embodiment, the present disclosure provides a third oriented film in accordance with any of the embodiments disclosed herein except that the third oriented film exhibits one or more of the following properties: (a) ultimate tensile strength averaged in MD and TD, measured according to ASTM D882, greater than or equal to 40 MPa; and (b) 2% secant modulus averaged in MD and TD, measured according to ASTM D882, is greater than or equal to 350 MPa. All individual values and subranges of an averaged ultimate tensile strength greater than or equal to 40 MPa are included herein and disclosed herein; for example, the averaged ultimate tensile strength of the third oriented film can be greater than or equal to 40 MPa, or in the alternative, from greater than or equal to 75 MPa, or in the alternative, from greater than or equal to 100 MPa. All individual values and subranges of an averaged 2% secant modulus greater than or equal to 350 MPa are included herein and disclosed herein; for example, the averaged 2% secant modulus of the third oriented film can be greater than or equal to 350 MPa, or in the alternative, from greater than or equal to 750 MPa, or in the alternative, from greater than or equal to 1000 MPa.

In yet another aspect the invention provides a process for forming an oriented polyethylene film comprising (a) selecting the first polyethylene composition according to any embodiment disclosed herein, the second polyethylene composition according to any embodiment disclosed herein, the third polyethylene composition according to any embodiment disclosed herein or any combination thereof; (b) forming a film from the polyethylene composition selected in step (a), (c) orienting the film formed in step (b) via a sequential orientation process with an MD draw ratio greater than 3 and a TD draw ratio greater than 5. All individual values and subranges of an MD draw ratio greater than 3 are included herein and disclosed herein; for example, the MD draw ration can from a lower limit of 3, 3.5, 4, 4.5 or 5. All individual values and subranges of a TD draw ratio greater than 5 are included herein and disclosed herein; for example, the MD draw ration can from a lower limit of 5, 5.5, 6, 6.5 or 7.

EXAMPLES

The following examples illustrate the present invention but are not intended to limit the scope of the invention.

Polyethylene Examples 1-3

Table 1 summarizes the composition of three polyethylenes compositions (PE Comp.) made using a 30 mm co-rotating, intermeshing Coperion Werner-Pfleiderer ZSK-30 twin screw extruder at 250° C. The ZSK-30 has ten barrel sections with an overall length of 960 mm and an L/D ratio of 32.

PE Polymer 1 is an LLDPE made using a Ziegler-Natta (ZN) catalyst and having a density of 0.935 g/cc and an $I_2$ of 1.0 g/10 min;

PE Polymer 2 is an LLDPE made using a Ziegler-Natta catalyst and having a density of 0.935 g/cc and an $I_2$ of 2.5 g/10 min;

PE Polymer 3 is an LLDPE made using molecular catalyst having a density of 0.905 g/cc and an $I_2$ of 15 g/10 min;

LDPE 621I is a low density polyethylene having a density of 0.918 g/cc and an $I_2$ of 2.3 g/10 min and is commercially available from The Dow Chemical Company;

LDPE-1 is a low density polyethylene having a density of 0.919 g/cc and an $I_2$ of 0.47 g/10 min; and Affinity PL 1880 is a polyolefin plastomer having a density of 0.902 g/cc and an $I_2$ of 1 g/10 min and is commercially available from The Dow Chemical Company.

33-mil cast sheets were made with a Dr. Collin cast film line (L/D=25 and D=30 mm) equipped with a 12 inch wide flat die. The die gap was 45 mil and output rate was about 8 kg/h. Melt temperature was 244° C. and die temperature was set at 260° C.

Square specimens were cut from the extruded sheet, and biaxially stretched with a Bruckner Karo IV biaxial stretcher at an engineering strain rate of 200%/s based on the original specimen dimensions. The preheat time before stretching was fixed to be 60 s. Stretching was performed either simultaneously in the two directions or sequentially. In simultaneous stretching, the sheet was stretched in both directions to a 6.5×6.5 stretch ratio. In sequential stretching, the specimen was constrained in cross direction and stretched in machine direction to 4×; after that, it was constrained in machine direction at 4× and stretched in transverse direction to 8×.

The cast sheets were also stretched into films with an Accupull stretcher. Only simultaneously biaxial orientation was conducted at 119.4° ° C. and an engineering strain rate of 100%/s. The stretch ratio was 4×8 in MD and TD, respectively. Preheat time was set at 100 s.

In the blown film process, 1 mil monolayer blown film was made using the 3-layer Dr. Collin blown film line. The line was comprised of three 25:1 L/D single screw extruders, equipped with grooved feed zones. The screw diameters were 25 mm for the inner layer, 30 mm for the core and 25 mm for the outer layer. The annular die was 60 mm in diameter and used a dual lip air ring cooling system. Die lip gap was set at 2 mm. Blow up ratio (BUR) was 2.5 and draw down ratio (DDR) was 31.5. Frost line height was 6 inch. Total output rate was around 10.7 kg/hour. Melt temperature and die temperature were set at 215° C.

TABLE 1

| PE Comp. Ex. | Component 1 | Component 2 | Component 3 | Density (g/cc) | $I_2$ (g/10 min) | $MW_{HDF>95}$ (kg/mol) | $I_{HDF>95}$ (kg/mol) |
|---|---|---|---|---|---|---|---|
| 1 | 70 wt % PE Polymer 1 | 30 wt % PE Polymer 3 | None | 0.927 | 1.6 | 145 | 65.8 |
| 2 | 55 wt % PE Polymer 1 | 30 wt % PE Polymer 3 | 7.5 wt % LDPE 621I; and 7.5 wt % LDPE-1 | 0.926 | 1.5 | 152 | 54.9 |
| 3 | 55 wt % PE Polymer 2 | 30 wt % Affinity PL1880 | 15 wt % LDPE 621I | 0.925 | 1.6 | 127 | 37.9 |

PE Composition Examples 1 and 2 were used to produce BOPE films. BOPE films could not be made from PE Composition Example 3. Biaxial stretchability of the samples was evaluated on a lab-scale tenter frame stretcher (Bruckner Karo IV). Results of simultaneous stretching and sequential stretching are summarized in Tables 2 and 3 where S means Succeed, F means Fail, and N means Not Tested. The success criterion for the simultaneous stretching is to achieve 6.5× stretch ratio in both MD and TD. The success criterion for the sequential stretching is to achieve 4× stretch ratio in MID and 8× in TD. Inventive Films 1 and 2 clearly show a good stretchability and a broad stretching temperature window.

TABLE 2

| | Oven temperature (° C.) | | | | | | | | | | |
|---|---|---|---|---|---|---|---|---|---|---|---|
| | 105 | 108 | 110 | 113 | 115 | 117 | 118 | 120 | 123 | 125 | 127 | 130 |
| PE Comp. Ex. 1 | N | N | N | N | N | N | F | S | S | S | F | N |
| PE Comp. Ex. 2 | N | N | N | N | F | S | S | S | S | F | N | N |
| PE Comp. Ex. 3 | F | F | F | F | F | F | F | F | F | F | F | F |

TABLE 3

| | Oven temperature (° C.) | | | | | | | | | | |
|---|---|---|---|---|---|---|---|---|---|---|---|
| | 105 | 108 | 110 | 113 | 115 | 117 | 118 | 120 | 123 | 125 | 127 | 130 |
| PE Comp. Ex. 1 | N | N | N | N | N | N | N | S | F | N | N | N |
| PE Comp. Ex. 2 | N | N | N | N | S | S | S | S | F | N | N | N |
| PE Comp. Ex. 3 | F | F | F | F | F | F | F | F | F | F | F | F |

TABLE 4

| | Raw material | Fabrication process | Process conditions |
|---|---|---|---|
| Inventive Film 1 | PE Comp. Ex. 2 | Tenter frame biaxial orientation on a Bruckner Karo IV stretcher. | Sequentially biaxial orientation. Draw ratio: 4 × 8 Orientation temperature: 115° C. |
| Comparative Film 1 | PE Comp. Ex. 2 | Blown film on a Dr. Collin blown film line. | BUR: 2.5 DDR: 31.5 |
| Inventive Film 2 | PE Comp. Ex. 2 | Tenter frame biaxial orientation on a Accupull stretcher. | Simultaneously biaxial orientation. Draw ratio 4 × 8 Orientation temperature 120° C. |

A polyethylene blown film (Comparative film 1), a biaxially oriented polyethylene film sequentially stretched to a draw ratio of 4×8 on the Bruckner stretcher at 115° C. (Inventive Film 1), and a biaxially oriented polyethylene film simultaneously stretched to a draw ratio of 4×8 on the Accupull stretcher (Inventive Film 2) and various film properties were tested and reported in Table 5.

Additional PE Compositions were prepared in a dual polymerization reactor system. Table 6 provides the reactor conditions for each of these dual reactor PE Compositions, PE Compositions 4, 5, 6, and 7. The properties of Reactor 2 products were calculated based on the measured properties of the Reactor 1 Products and the Final products according to $$1/\rho_f = w_1/\rho_1 + w_2/\rho_2$$

$$MI_f^{-0.277} = w_1 MI_1^{-0.277} + w_2 MI_2^{-0.277}$$

where $\rho$ is density, w is weight fraction, MI is melt index ($I_2$), subscript 1 denotes the reactor 1, subscript 2 denotes the reactor 2 and subscript f denotes the final product.

Tables 6-7 provide certain properties of these PE Compositions. Blends of these PE Compositions 5-7 with a low density polyethylene were also produced, as described in Table 8.

TABLE 6

| | Reactor 1 catalyst | Reactor 1 Product density (g/cc) | Reactor 1 Product $I_2$ (g/10 min) | Reactor 2 catalyst | Reactor 2 Product density (g/cc)* | Reactor 2 Product $I_2$ (g/10 min) | Reactor 1/ Reactor 2 split, % | Final product density (g/cc) | Final Product $I_2$ (g/10 min) |
|---|---|---|---|---|---|---|---|---|---|
| PE Comp. 4 | ZN | 0.956 | 0.6 | ZN | 0.914 | 3.2 | 30/70 | 0.926 | 1.8 |
| PE Comp. 5 | ZN | 0.935 | 0.6 | ZN | 0.925 | 3.5 | 30/70 | 0.928 | 1.9 |
| PE Comp. 6 | ZN | 0.934 | 0.6 | ZN | 0.924 | 5.5 | 40/60 | 0.928 | 1.9 |
| PE Comp. 7 | Molecular | 0.905 | 15 | ZN | 0.939 | 0.65 | 35/65 | 0.927 | 1.5 |

*calculated as described below

TABLE 5

| | Comparative Film 1 | Inv. Film 1 | Inv. Film 2 |
|---|---|---|---|
| Thickness, mil | 1 | 0.9 | 0.9 |
| Clarity, % | 95 | 99 | 99 |
| Haze, % | 10.6 | 2.4 | 2.4 |
| 2% secant modulus in TD, MPa | 322 | 1117 | 569 |
| 2% secant modulus in MD, MPa | 261 | 1010 | 468 |
| 2% secant modulus averaged in MD and TD, MPa | 292 | 1064 | 519 |
| Ultimate tensile strength in TD, MPa | 30 | 153 | 64 |
| Ultimate tensile strength in MD, MPa | 36 | 135 | 31 |
| Ultimate tensile strength averaged in MD and TD, MPa | 33 | 144 | 48 |
| Puncture peak load (N) | 26 | Not tested | 51 |

TABLE 7

| | $MW_{HDF>95}$ (kg/mol) | $I_{HDF>95}$ (kg/mol) |
|---|---|---|
| PE Comp. 4 | 151 | 63.4 |
| PE Comp. 5 | 152 | 59.3 |
| PE Comp. 6 | 154 | 65.8 |
| PE Comp. 7 | 149 | 68.1 |

TABLE 8

| | Composition (in weight %) | $MW_{HDF>95}$ (kg/mol) | $I_{HDF>95}$ (kg/mol) |
|---|---|---|---|
| PE Comp. 4-a | 85% PE Comp. 4 + 15% LDPE 621I | 148 | 51.3 |
| PE Comp. 5-a | 90% PE Comp. 5 + 10% LDPE 621I | 158 | 56.4 |
| PE Comp. 5-b | 85% PE Comp. 5 + 15% LDPE 621I | 158 | 53.3 |
| PE Comp. 6-a | 90% PE Comp. 6 + 10% LDPE 621I | 156 | 59.0 |
| PE Comp. 6-b | 85% PE Comp. 6 + 15% LDPE 621I | 158 | 59.7 |
| PE Comp. 7-a | 90% PE Comp. 7 + 10% LDPE 621I | 150 | 61.9 |
| PE Comp. 7-b | 85% PE Comp. 7 + 15% LDPE 621I | 153 | 60.9 |

Table 9 provides the simultaneously biaxial orientation results (tested by the Bruckner biaxial stretcher) for films using a MD draw ratio of 6.5× and a TD draw ratio of 6.5× produced using several of the PE Compositions shown in Tables 6 and 8.

TABLE 9

| | Oven temperature (° C.) | | | | | | | |
|---|---|---|---|---|---|---|---|---|
| | 110 | 113 | 115 | 117 | 120 | 122 | 125 | 127 |
| Inventive Film 4-a | N | F | S | S | S | S | S | F |
| Inventive Film 5 | N | F | F | F | S | S | F | N |
| Inventive Film 5-a | N | F | F | S | S | S | F | N |
| Inventive Film 5-b | F | F | F | S | S | S | F | N |
| Inventive Film 6 | N | F | F | F | F | S | F | N |
| Inventive Film 6-a | N | F | F | F | S | S | F | N |
| Inventive Film 6-b | F | F | S | S | S | S | F | N |
| Inventive Film 7 | N | F | F | F | F | F | S | F |
| Inventive Film 7-a | N | F | F | F | F | S | F | N |
| Inventive Film 7-b | F | F | F | F | S | S | F | N |

Table 10 provides the sequentially biaxial orientation results (tested by the Bruckner biaxial stretcher) for films using a MD draw ratio of 4× and a TD draw ratio of 8×, produced using several of the PE Compositions shown in Tables 6 and 8.

TABLE 10

| | Oven temperature (° C.) | | | | | | | |
|---|---|---|---|---|---|---|---|---|
| | 110 | 113 | 115 | 117 | 120 | 122 | 125 | 127 |
| Inventive Film 4-a | N | N | S | S | S | S | S | F |
| Inventive Film 5-a | N | F | S | S | S | S | F | N |
| Inventive Film 5-b | N | F | S | S | S | S | F | N |
| Inventive Film 6-a | N | F | S | S | S | S | S | F |
| Inventive Film 6-b | N | F | S | S | S | S | S | F |
| Inventive Film 7-a | N | F | S | S | S | S | S | F |
| Inventive Film 7-b | N | F | S | S | S | S | S | F |

Test Methods

Melt index, or $I_2$, was measured in accordance with ASTM D 1238, condition 190° C./2.16 kg. Density was first measured according to ASTM D 1928. Density measurements were made using ASTM D792, Method B.

Tensile properties in both directions were determined using ASTM D882 as was the 2% secant modulus. 2% secant modulus averaged in MD and TD=(2% secant modulus in MD+2% secant modulus in TD)/2. Ultimate tensile strength averaged in MD and TD=(Ultimate tensile strength in MD+Ultimate tensile strength in TD)/2. Puncture test was performed using a modified ASTM D 5748 with a 0.5" diameter stainless steel probe.

Film gloss at 20° was determined using ASTM D2457 while haze was done via ASTM D1003 and clarity by ASTM D1746.

Crystallization Elution Fractionation (CEF) is described by Monrabal et al, *Macromol. Symp.* 257, 71-79 (2007). The instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is now referred to as "ODCB." ODBC is sparged with dried nitrogen ($N_2$) for one hour before use. Dried nitrogen is obtained by passing nitrogen at <90 psig over $CaCO_3$ and 5 Å molecular sieves. Sample preparation is done with an autosampler at 4 mg/ml under shaking at 160° C. for 2 hours. The injection volume is 300 µl. The temperature profile of CEF is: crystallization at 3° C./min from 110° C. to 30° C., thermal equilibrium at 30° ° C. for 5 minutes (including Soluble Fraction Elution Time being set as 2 minutes), and elution at 3° C./min from 30° ° C. to 140° C. The flow rate during crystallization is 0.052 ml/min. The flow rate during elution is 0.50 ml/min. The data are collected at one data point/second.

The CEF column is packed with glass beads at 125 µm±6% (such as those commercially available from MO-SCI Specialty Products) with ⅛ inch stainless tubing according to US 2011/0015346 A1. The internal liquid volume of the CEF column is between 2.1 and 2.3 mL. Temperature calibration is performed by using a mixture of NIST Standard Reference Material Linear polyethylene 1475a (1.0 mg/ml) and Eicosane (2 mg/ml) in ODCB. The calibration consists of four steps: [(1)] Calculating the delay volume defined as the temperature offset between the measured peak elution temperature of Eicosane minus 30.00° C.; [(2)] Subtracting the temperature offset of the elution temperature from the CEF raw temperature data. It is noted that this temperature offset is a function of experimental conditions, such as elution temperature, elution flow rate, etc.; [(3)] Creating a linear calibration line transforming the elution temperature across a range of 30.00° C. and 140.00° ° C. such that NIST linear polyethylene 1475a has a peak temperature at 101.00° C., and Eicosane has a peak temperature of 30.00° C., [(4)] For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

A linear baseline is calculated by selecting two data points: one before the polymer elutes, usually at temperature of 26° C., and another one after the polymer elutes, usually at 118° C. For each data point, the detector signal is subtracted from the baseline before integration.

Molecular Weight of High Density Fraction ($MW_{HDF>95}$) and High Density Fraction Index ($I_{HDF>95}$)

The polymer molecular weight can be determined directly from LS (light scattering at 90 degree angle, Precision Detectors) and the concentration detector (IR-4, Polymer Char) according to the Rayleigh-Gans-Debys approximation (A. M. Striegel and W. W. Yau, Modern Size-Exclusion Liquid Chromatography, $2^{nd}$ Edition, Page 242 and Page 263, 2009) by assuming a form factor of 1 and all the virial coefficients equal to zero. Baselines are subtracted from the LS (90 degree) and IR-4 (measurement channel) chromatograms. For the whole resin, integration windows are set to integrate all the chromatograms in the elution temperature (temperature calibration is specified above) ranging from 25.5 to 118° C. The high density fraction is defined as the fraction that has an elution temperature higher than 95.0° C. in CEF. Measuring the $MW_{HDF>95}$ and $I_{HDF>95}$ includes the following steps:

(1) Measuring the interdetector offset. The offset is defined as the geometric volume offset between LS detector with respect to the IR-4 detector. It is calculated as the difference in elution volume (mL) of the polymer peak between the IR-4 and LS chromatograms. It is converted to the temperature offset by using the elution thermal rate and elution flow rate. A high density polyethylene (with no comonomer, melting index $I_2$ of 1.0, polydispersity or molecular weight distribution $M_w/M_n$ approximately 2.6 by conventional gel permeation chromatography) is used. The same experimental conditions as the CEF method above are used except for the following parameters: crystallization at 10° C./min from 140° ° C. to 137° C., thermal equilibrium at 137° C. for 1 minute as the Soluble Fraction Elution Time, and elution at 1° C./min from 137° C. to 142° C. The flow rate during crystallization is 0.10 ml/min. The flow rate during elution is 0.80 ml/min. The sample concentration is 1.0 mg/ml.

(2) Each data point in the LS chromatogram is shifted to correct for the interdetector offset before integration.

(3) Molecular weight at each retention temperature is calculated as the baseline subtracted LS signal/the baseline subtracted IR4 signal/MW constant (K)

(4) The baseline subtracted LS and IR-4 chromatograms are integrated in the elution temperature range of 95.0 to 118.0° C.

(5) The Molecular weight of the high density fraction ($MW_{HDF>95}$) is calculated according to $$MW_{HDF>95} = \int_{95}^{118} Mw \cdot C \cdot dT \bigg/ \int_{95}^{118} C \cdot dT$$

where Mw is the molecular weight of the polymer fraction at the elution temperature T and Cis the weight fraction of the polymer fraction at the elution temperature Tin the CEF, and $$\int_{25}^{118} C \cdot dT = 100\%$$

(6) High density fraction index ($I_{HDF>95}$) is calculated as $$I_{HDF>95} = \int_{95}^{118} Mw \cdot C \cdot dT$$

where Mw in is the molecular weight of the polymer fraction at the elution temperature T in the CEF.

The MW constant (K) of CEF is calculated by using NIST polyethylene 1484a analyzed with the same conditions as for measuring interdetector offset. The MW constant (K) is calculated as "(the total integrated area of LS) of NIST PE1484a/(the total integrated area) of IR-4 measurement channel of NIST PE 1484a/122,000".

The white noise level of the LS detector (90 degree) is calculated from the LS chromatogram prior to the polymer eluting. The LS chromatogram is first corrected for the baseline correction to obtain the baseline subtracted signal. The white noise of the LS is calculated as the standard deviation of the baseline subtracted LS signal by using at least 100 data points prior to the polymer eluting. Typical white noise for LS is 0.20 to 0.35 mV while the whole polymer has a baseline subtracted peak height typically around 170 mV for the high density polyethylene with no comonomer, $I_2$ of 1.0, polydispersity $M_w/M_n$ approximately 2.6 used in the interdetector offset measurements. Care should be maintained to provide a signal to noise ratio (the peak height of the whole polymer to the white noise) of at least 500 for the high density polyethylene.

We claim:

1. An oriented film comprising a polyethylene composition comprising:
   75 to less than 100 wt % of a first polyethylene composition; and
   greater than 0 to 25 wt % of at least one resin selected from the group consisting of linear low density polyethylene, low density polyethylene, ethylene copolymers, propylene copolymers and high density polyethylene;
   wherein the first polyethylene composition comprises from 20 to 50 wt % of a first linear low density polyethylene polymer having a density greater than 0.925 g/cc and an $I_2$ lower than 2 g/10 min; and
   from 80 to 50 wt % of a second linear low density polyethylene polymer having a density lower than 0.925 g/cc and an $I_2$ greater than 2 g/10 min;
   wherein the first polyethylene composition has an $I_2$ from 0.5 to 10 g/10 min and a density from 0.910 to 0.940 g/cc.

2. The oriented film according to claim 1, wherein the first polyethylene composition has an MWHDF>95 greater than 135 kg/mol and IHDF>95 greater than 42 kg/mol.

3. The oriented film according to claim 1, wherein the oriented film is oriented below the melting point of the first polyethylene composition.

4. The oriented film according to claim 1, wherein the first polyethylene composition comprises from 20 to 45 wt. % of the first linear low density polyethylene polymer.

5. The oriented film according to claim 1, wherein the at least one resin is selected from the group consisting of low density polyethylene, ethylene copolymers, propylene copolymers and high density polyethylene.

6. The oriented film according to claim 1, wherein the at least one resin is a propylene copolymer.

7. The oriented film according to claim 1, wherein the polyethylene composition further comprises a second polyethylene composition, wherein the second polyethylene composition comprises from 50 to 80 wt % of a third linear low density polyethylene polymer having a density greater than 0.925 g/cc and an $I_2$ less than 2 g/10 min; and
   from 50 to 20 wt % of a fourth linear low density polyethylene polymer having a density lower than 0.920 g/cc and an $I_2$ greater than 2 g/10 min;
   wherein the second polyethylene composition has an $I_2$ from 0.5 to 10 g/10 min and a density from 0.910 to 0.940 g/cc.

8. The oriented film according to claim 1, wherein the oriented film is a biaxially oriented film.

9. The biaxially oriented film according to claim 8 which has been oriented via a sequential orientation process with an MD draw ratio greater than 3 and a TD draw ratio greater than 5.

10. The biaxially oriented film according to claim 8 which has been oriented via a simultaneous orientation process with an MD draw ratio greater than 4 and a TD draw ratio greater than 4.

11. A co-extruded film comprising at least one film layer comprising the oriented film according to claim 1.

12. The oriented film according to claim 1, wherein the oriented film exhibits one or more of the following properties:
- ultimate tensile strength averaged in MD and TD, measured according to ASTM D882, greater than or equal to 40 MPa; and
- 2% secant modulus averaged in MD and TD, measured according to ASTM D882, greater than or equal to 350 MPa.

* * * * *